(12) United States Patent
Yoho et al.

(10) Patent No.: US 10,597,062 B2
(45) Date of Patent: Mar. 24, 2020

(54) STEERING COLUMN ASSEMBLY WITH CRASH BRACKET ROTATION DAMPENING MECHANISM AND METHODS OF MAKING AND USING SAME

(71) Applicants: THYSSENKRUPP PRESTA AG, Eschen (LI); THYSSENKRUPP AG, Essen (DE)

(72) Inventors: Justin Yoho, Whitestown, IN (US); Thomas Geiselberger, Carmel, IN (US)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 109 days.

(21) Appl. No.: 15/727,898

(22) Filed: Oct. 9, 2017

(65) Prior Publication Data

US 2019/0106143 A1    Apr. 11, 2019

(51) Int. Cl.
*B62D 1/181* (2006.01)
*B62D 1/185* (2006.01)
*B62D 1/19* (2006.01)

(52) U.S. Cl.
CPC .............. *B62D 1/181* (2013.01); *B62D 1/185* (2013.01); *B62D 1/192* (2013.01); *B62D 1/195* (2013.01)

(58) Field of Classification Search
CPC .......... B62D 1/18; B62D 1/181; B62D 1/185; B62D 1/192; B62D 1/195; F16F 7/123
See application file for complete search history.

(56) References Cited

U.S. PATENT DOCUMENTS

| 4,901,593 | A | * | 2/1990 | Ishikawa | B62D 1/181 280/775 |
| 5,115,691 | A | * | 5/1992 | Beauch | B62D 1/192 280/777 |
| 5,520,416 | A | * | 5/1996 | Singer, III | B62D 1/181 280/775 |
| 5,706,704 | A | * | 1/1998 | Riefe | B62D 1/195 188/371 |
| 5,738,377 | A | * | 4/1998 | Sugiki | B62D 1/195 188/376 |
| 7,267,370 | B2 | | 9/2007 | Drinan | |
| 7,779,945 | B2 | | 8/2010 | Allguer | |

(Continued)

FOREIGN PATENT DOCUMENTS

| DE | 102006028832 A1 | 12/2007 |
| DE | 102008034807 B3 | 10/2009 |

(Continued)

*Primary Examiner* — Frank B Vanaman
(74) *Attorney, Agent, or Firm* — Lathrop GPM LLP

(57) ABSTRACT

A steering column assembly for a vehicle comprises a motorized length adjustment drive unit, a box rocker having a control surface, a column jacket, and a crash bracket releasably coupled to the column jacket. The assembly includes an energy absorbing member having a proximal end and a distal end. The proximal end is coupled to the crash bracket and the distal end is coupled to the column jacket. A plate is attached to the box rocker such that a channel is formed between the plate and the control surface. At least one anti-rotation member is coupled to the crash bracket and extends through the channel. The at least one anti-rotation member is adapted to inhibit rotation of the crash bracket during a frontal collision of the vehicle.

15 Claims, 2 Drawing Sheets

(56) References Cited

U.S. PATENT DOCUMENTS

| | | |
|---|---|---|
| 8,127,639 B2 | 3/2012 | Manwaring et al. |
| 8,474,869 B2 | 7/2013 | Sulser et al. |
| 8,910,365 B2 | 12/2014 | Walser |
| 9,056,628 B2 | 6/2015 | Russell et al. |
| 2004/0100084 A1* | 5/2004 | Munro ................... B62D 1/195 280/777 |
| 2004/0232685 A1* | 11/2004 | Gatti ....................... B62D 1/195 280/777 |
| 2007/0013183 A1* | 1/2007 | Jensen ................... B62D 1/195 280/777 |
| 2008/0012281 A1* | 1/2008 | Cho ....................... B62D 1/195 280/777 |
| 2009/0120229 A1* | 5/2009 | Shibazaki .............. B62D 1/195 74/492 |
| 2012/0266716 A1 | 10/2012 | Sulser et al. |
| 2014/0284909 A1 | 9/2014 | Nakazato et al. |
| 2015/0232117 A1* | 8/2015 | Stinebring ............. B62D 1/195 74/493 |
| 2015/0239490 A1* | 8/2015 | Sakata ................... B62D 1/195 74/493 |
| 2015/0251683 A1 | 9/2015 | Caverly et al. |
| 2015/0360714 A1* | 12/2015 | Tanaka ................... B62D 1/195 74/493 |
| 2016/0123376 A1 | 5/2016 | Buschbeck |
| 2016/0368524 A1 | 12/2016 | Tinnin |
| 2017/0259842 A1 | 9/2017 | Dubay et al. |
| 2018/0009463 A1* | 1/2018 | Yoshihara .............. B62D 1/184 |

FOREIGN PATENT DOCUMENTS

| | | |
|---|---|---|
| DE | 102015204894 A1 | 9/2016 |
| DE | 102016214163 A1 | 10/2016 |

\* cited by examiner

STEERING COLUMN ASSEMBLY WITH CRASH BRACKET ROTATION DAMPENING MECHANISM AND METHODS OF MAKING AND USING SAME

FIELD OF THE DISCLOSURE

The disclosure relates generally to the field of steering column assemblies for motor vehicles. More specifically, the disclosure relates to a steering column assembly configured to absorb energy during a frontal collision.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a steering column assembly for a vehicle comprises a motorized length adjustment drive unit, a box rocker having a control surface, a column jacket, and a crash bracket releasably coupled to the column jacket. The assembly includes an energy absorbing member having a proximal end and a distal end. The proximal end is coupled to the crash bracket and the distal end is coupled to the column jacket. A plate is attached to the box rocker such that a channel is formed between the plate and the control surface. At least one anti-rotation member is coupled to the crash bracket and extends through the channel. The at least one anti-rotation member is adapted to inhibit rotation of the crash bracket during a frontal collision of the vehicle.

In an embodiment, the at least one anti-rotation member includes a bolt.

In an embodiment, the assembly includes a drive unit spindle coupled to the crash bracket.

In an embodiment, the energy absorbing member includes a sheet configured to deform during the frontal collision.

In an embodiment, the distal end is welded to the column jacket.

In an embodiment, the anti-rotation member inhibits rotation of the crash bracket after the crash bracket is released from the column jacket during the frontal collision.

In an embodiment, the plate is formed of metal or steel.

According to another embodiment, a shock absorbing steering column assembly for a vehicle comprises a box rocker, a column jacket, and a crash bracket. The box rocker has a channel associated with it. An energy absorbing member is coupled to the column jacket and the crash bracket. The assembly includes at least one anti-rotation member that extends through the channel. The anti-rotation member is adapted to inhibit rotation of the crash bracket during a collision of the vehicle.

In an embodiment, a rivet releasably couples the crash bracket to the column jacket.

In an embodiment, the energy absorbing member is a bend tear sheet.

In an embodiment, the assembly includes a length adjustment drive unit. And, a plate is coupled to the box rocker to form the channel.

In an embodiment, the length adjustment drive unit includes a motor having associated therewith with a spindle coupled to the crash bracket.

In an embodiment, the spindle is coupled to the crash bracket via a rotationally free nut.

In an embodiment, the at least one anti-rotation member includes a first bolt and a second bolt.

In an embodiment, the first bolt is configured to constrain rotation of the crash bracket by abutting against a control surface of the box rocker.

In an embodiment, the second bolt is configured to constrain rotation of the crash bracket by abutting against a plate coupled to the box rocker.

In an embodiment, a lateral distance between the first bolt and a neighboring edge of the crash bracket is less than a lateral distance between the first bolt and the second bolt.

According to another embodiment, a method for inhibiting rotation of a crash bracket of a steering column assembly of a vehicle comprises coupling an energy absorbing member to the crash bracket and a column jacket. The method includes attaching a plate to a box rocker such that a channel is formed between the box rocker and the plate. The method comprises passing at least one anti-rotation member through each of the channel and the crash bracket to inhibit rotation of the crash bracket during a frontal collision of the vehicle.

In an embodiment, the method includes coupling the crash bracket to the column jacket via one of a rivet and a pin. The rivet or the pin is configured to shear during the frontal collision.

In an embodiment, the method includes coupling the crash bracket to a spindle of a length adjustment drive unit.

In an embodiment, the anti-rotation member facilitates relative movement between two ends of the energy absorbing member.

BRIEF DESCRIPTION OF THE SEVERAL VIEWS OF THE DRAWINGS

Illustrative embodiments of the present disclosure are described in detail below with reference to the attached drawing figures and wherein.

DETAILED DESCRIPTION

Figure 1:
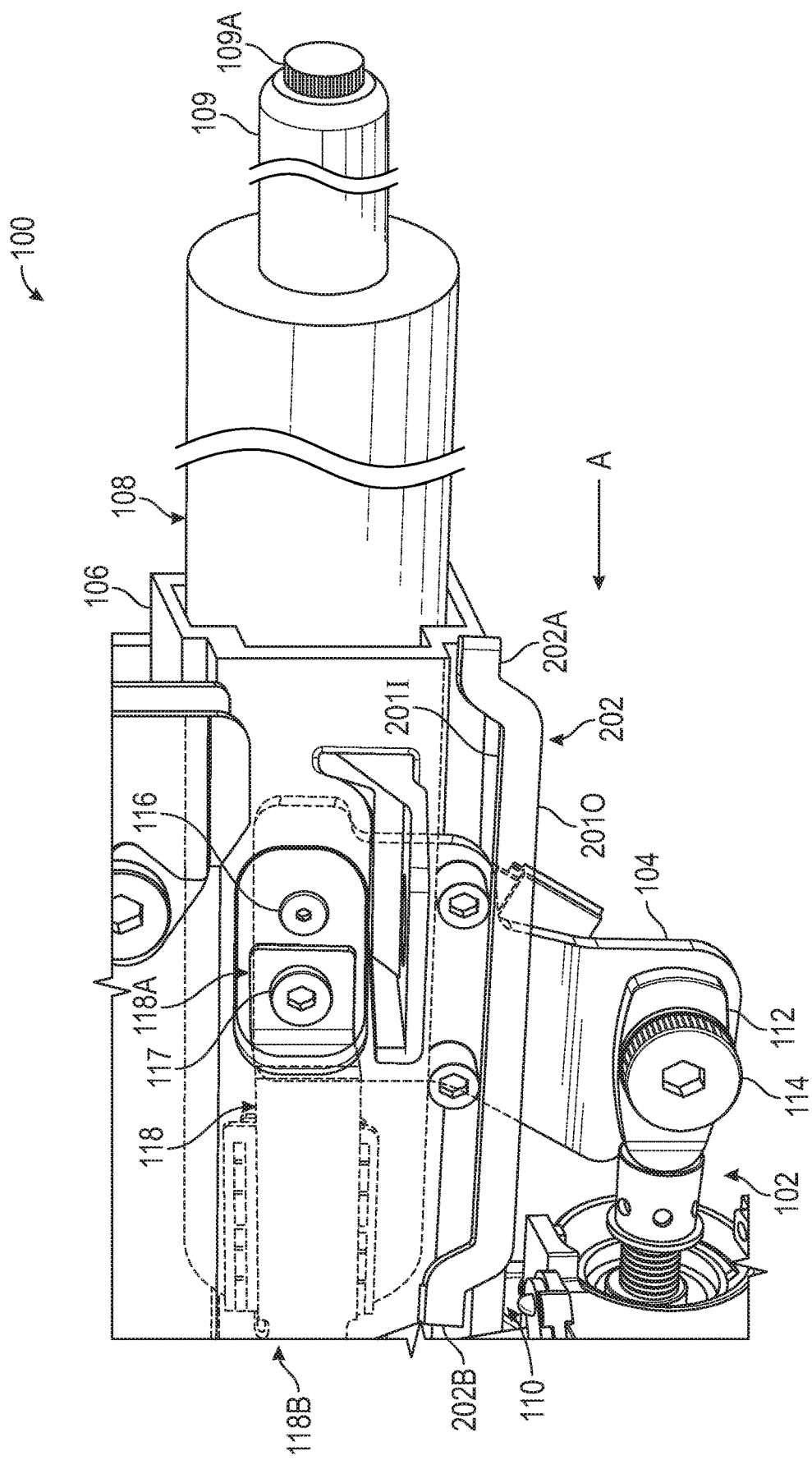
FIG. 1 is a front view of an energy absorbing steering column assembly, according to an embodiment of the present disclosure.

Steering column assemblies for motor vehicles are known in the art. A steering column assembly typically includes a steering wheel spindle to which the steering wheel is coupled. The steering wheel spindle may have associated therewith a generally cylindrical tube, commonly referred to by the artisan as a column jacket or column jacket tube, which extends into a rocker (e.g., a box rocker or outer column jacket). The artisan appreciates that the steering column assembly may allow a driver to selectively adjust the location of the steering wheel according to the driver's preferences. For example, the driver may unlock a steering locking mechanism and manually push the steering wheel away from the driver and/or pull the steering wheel towards the driver for driver comfort. The driver may then lock the steering locking mechanism, which may generally preclude the steering wheel from moving in a forward or rearward direction. The steering column assembly may also allow the driver to selectively adjust the steering wheel in the vertical plane.

Some steering column assemblies may include a motorized length adjustment drive unit to facilitate the adjustment of the steering wheel based on user command. As is known, and as discussed in more detail herein, the motorized length adjustment drive unit may include a motor and a length adjustment drive unit spindle. For steering columns with a motorized length adjustment drive unit, a locking mechanism is not necessary but possible. The length adjustment drive unit spindle may be coupled via a spindle bolt to a crash bracket. The crash bracket may in turn be coupled by a shear element (e.g., a crash rivet) to the column jacket. That is, the crash bracket may connect the length adjustment drive unit spindle to the column jacket. The column jacket may be coupled to the steering wheel spindle, which may be coupled to the steering wheel. A control switch (e.g., a dual function control switch) may be provided on the dashboard or elsewhere to allow the driver to adjust the position of the steering wheel (e.g., to move the steering wheel towards and/or away from the driver). For example, if the driver wishes to move the steering wheel away from the driver, he may depress the control switch to cause the motor to rotate in one direction. Rotation of the motor in the selected direction may cause the length adjustment drive unit spindle to move away from the driver in a lateral direction. Because the length adjustment drive unit spindle may be coupled to the crash bracket via the spindle bolt, movement of the length adjustment drive unit spindle away from the driver may cause the crash bracket to likewise move away from the driver. And because the crash bracket may be coupled to the column jacket via the crash rivet, lateral movement of the crash bracket away from the driver may cause the column jacket to move along with. Lateral movement of the column jacket away from the driver may in turn cause the steering wheel spindle to move in the same direction, and the steering wheel may resultantly move away from the driver. The driver may similarly use the control switch to rotate the motor in the other direction, which may ultimately cause the steering wheel to travel towards the driver.

FIG. 1 shows an example steering column assembly 100 according to an embodiment of the present disclosure and illustrates these concepts in additional detail. The steering column assembly 100 may include a length adjustment drive unit 102, a crash bracket 104, a box rocker 106, a column jacket (or tube) 108, and a steering wheel spindle 109. The steering wheel may be coupled to a steering wheel receiving end 109A of the steering wheel spindle 109.

The length adjustment drive unit 102 may include a motor 110 operably coupled to a length adjustment drive unit spindle 112. The length adjustment drive unit spindle (or the "drive unit spindle") 112 may be coupled to the crash bracket 104 via a drive unit spindle nut 114. The nut 114, in embodiments, may be rotationally free. The crash bracket 104 may be coupled to the column jacket 108 via a rivet 116, referred to herein as the crash rivet 116. When the driver wishes to adjust the steering wheel, e.g., desires for the steering wheel to move away from the driver, he may employ the control switch to cause the motor 110 to rotate in the desired direction. Rotation of the motor 110 may pull the drive unit spindle 112 in a direction A, away from the driver. Movement of the drive unit spindle 112 in the direction A may cause the crash bracket 104 coupled to the drive unit spindle 112 to also move in the direction A. As the crash bracket 104 is coupled to the column jacket 108 via the crash rivet 116, movement of the crash bracket 104 in the direction A may cause the column jacket tube 108 to also travel in the direction A. And movement of the column jacket 108 in the direction A may cause the steering wheel spindle 109 to move in the direction A, which may in turn cause the steering wheel to also move in the direction A in line with the drive input. The driver may likewise cause the steering wheel to move in the opposite direction by using the control switch to rotate the motor in the other direction.

It may be desirable for the steering column assembly 100 to absorb and/or dissipate (collectively, "absorb") energy during a frontal collision. To this end, the steering column assembly 100 may have an energy absorbing member 118. The energy absorbing member 118, in an embodiment, may comprise a sheet made of metal or other suitable materials that is configured to bend and/or tear to absorb energy. For example, as shown in FIG. 1, the energy absorbing member 118 may be or may comprise a bend tear sheet. The bend tear sheet 118 may have a proximal end 118A and a distal end 118B. The proximal end 118A of the bend tear sheet 118 may be coupled to the crash bracket 104 via a bend tear sheet fastener (e.g., a nut) 117. The distal end 118B of the bend tear sheet 118 may be attached to the column jacket 108, e.g., by screwing or welding or form fit or other means.

During a frontal collision (e.g., with another vehicle or some other structure), the subject vehicle may come to a halt or at least rapidly decelerate because of the physical impact. The driver, conversely, may have the tendency to continue to move in the vehicle's original direction of travel. The driver may resultantly be lunged forward into the steering wheel abruptly. The force applied by the driver to the steering wheel may cause the steering wheel to move in the direction A. Movement of the steering wheel in the direction A may cause the steering wheel spindle 109 and the column jacket 108 to also move in the direction A.

In the event of a frontal collision, the movement of the column jacket 108 in the direction A is caused by the impact of the driver with the steering wheel (as opposed to by the rotation of the motor 110, which has not been activated by the driver). The crash rivet 116 may be configured to shear (i.e., break off) in case of relative movement between the crash bracket 104 and the column jacket 108. The movement of the column jacket 108 in the direction A during the crash may be sudden, which may cause the column jacket 108 to instantaneously move relative to the crash bracket 104. The resulting force may cause the crash rivet 116 to shear, the benefit of which will become clear from the discussion herein. Because the crash bracket 104 is coupled directly to the column jacket 108 only via the crash rivet 116, shearing of the crash rivet 116 during (or due to) a frontal collision may sever the solitary direct connection between the crash bracket 104 and the column jacket 108. The crash bracket 104 may, however, continue to be indirectly coupled to the column jacket 108 via the bend tear sheet 118 that is coupled to each of the crash bracket 104 and the column jacket 108.

As noted, the absorbing member/bend tear sheet 118 may be configured to absorb at least some of the shock caused by the sudden impact of the driver with the steering wheel. More specifically, the bend tear sheet 118 may be configured to bend and/or tear during the frontal collision so that at least some of the energy is absorbed in the bending and tearing thereof. Bending and/or tearing of the bend tear sheet 118 is optimally effectuated when one end of the bend tear sheet moves relative to the other end (e.g., when the distal end 118B of the bend tear sheet 118 moves in the direction A along with the column jacket 108 because of the weld(s) therebetween but the proximal end 118A of the bend tear sheet 118 coupled to the crash bracket 104 remains stationary). If each end of the bend tear sheet 118A and 118B moves in unison, e.g., in direction A, the force absorption thereby would be minimal and insignificant. It may be thus desirable to ensure that during the frontal collision, one end of the bend tear sheet 118 (e.g., distal end 118B welded to the column jacket 108) moves in the direction A whereas the other end of the bend tear sheet 118 (e.g., proximal end 118A coupled to the crash bracket 104 via the bend tear sheet nut 117) remains generally stationary.

In practice though, because the bend tear sheet 118 is coupled to each of the column jacket 108 and the crash bracket 104, it has the tendency to cause the crash bracket 104 to move in response to the movement of the column jacket 108. More specifically, as the column jacket 108 moves in the direction A because of driver impact, it causes the distal end 118B of the bend tear sheet 118 welded thereto to also move in the direction A. The bend tear sheet 118, e.g., the distal end 118B thereof, exerts a force on the proximal end 118A of the bend tear sheet 118 and attempts to pull it in the direction A. Because the bend tear sheet proximal end 118A is coupled to the crash bracket via the bend tear sheet nut 117, movement of the proximal end 118A of the bend tear sheet 118 in the direction A in turn causes the crash bracket 104 to also travel. As the motor 110 has not been actuated, the drive unit spindle 112 may impede the movement of the crash bracket 104 in a lateral direction. But, the crash bracket 104 may nevertheless have the tendency to rotate (in a counter-clockwise direction, together with the length adjustment drive unit 102) because of the pulling force applied by the column jacket 108 via the bend tear sheet 118. Rotation of the crash bracket 104 in this fashion, as noted, is undesirable, however, because it causes the proximal end 118A of the bend tear sheet to also move; movement of the proximal end 118A of the bend tear sheet inhibits the relative movement of the bend tear sheet ends 118A and 118B, and thereby, adversely affects the shock absorption capabilities of the bend tear sheet 118. The present disclosure may, among other things, ensure that the crash bracket 104, and thus the proximal end 118A of the bend tear sheet 118 coupled thereto, remains generally stationary during a frontal collision, so that the relative movement of the distal end 118B and the proximal end 118A of the bend tear sheet 118 causes the bend tear sheet 118 to deform and desirably absorb at least some of the energy that would have otherwise been transferred to the driver.

Figure 2:
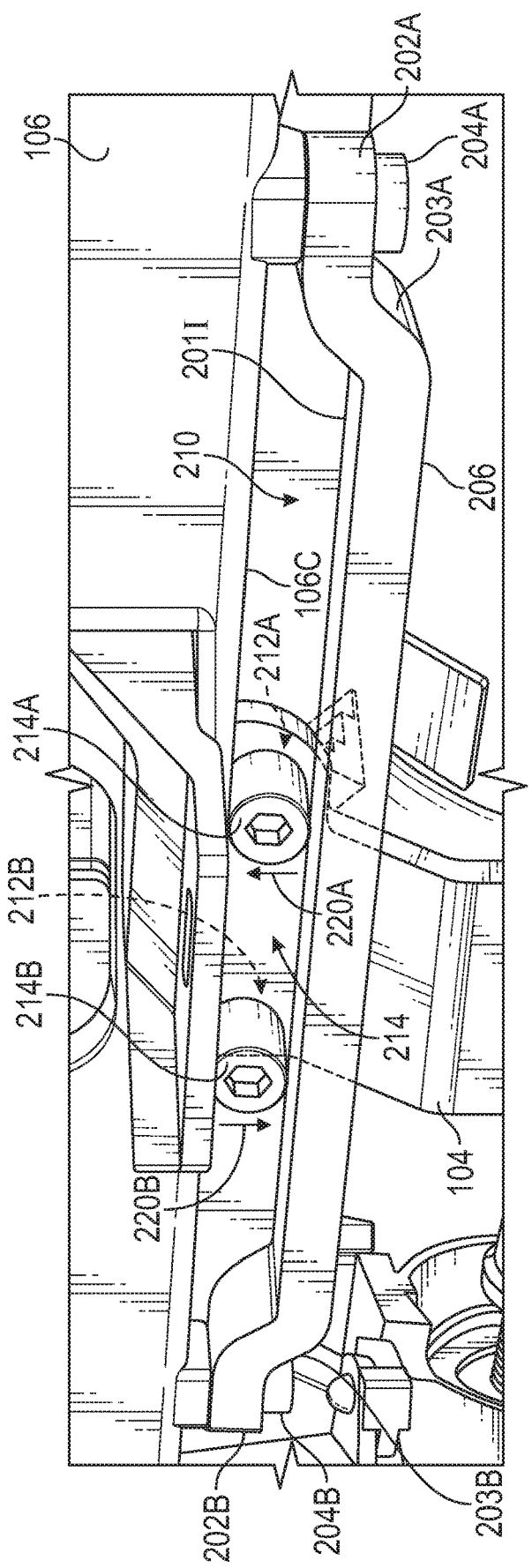
FIG. 2 is another front view of the energy absorbing steering column assembly of FIG. 1.

In more detail, in an embodiment, the steering column assembly 100 may include a support plate 202 having an inner surface 2011 and an outer surface 2010. The support plate 202 may be made of steel or other desirable materials, and ends 202A and 202B thereof may be coupled to the box rocker 106 via fasteners 204A and 204B, respectively, such that the support plate 202 is adjacent and in front of the crash bracket 104 (see FIG. 2). For example, as shown in FIG. 2, the support plate 202 may have lateral (or generally lateral) portion 206 and two curved end portions 203A and 203B that terminate respectively in the ends 202A and 202B. The end 202A may be coupled to the box rocker 106 via the fastener 204A and the end 202B may be coupled to the box rocker 106 via the fastener 204B. Alternately, the support plate 202 may be frusto-rectangular or take on other regular or irregular shapes. In one currently preferred embodiment, the support plate 202 may include or provide together with the box rocker 106 a channel 210 through which the crash bracket 104 may be accessed.

In an embodiment, one or more openings (e.g., threaded openings) accessible through the channel 210 may be provided in the crash bracket 104 and a bolt (or stud, screw, rivet, tab, or other such member, also referred to herein as an anti-rotation member) may be passed through or otherwise housed within each of the one or more openings in the crash bracket 104. For example, as illustrated in FIG. 2, in one embodiment the crash bracket 104 may include a threaded opening 212A and another threaded opening 212B, and bolts 214A, 214B may be passed through the opening 212A and 212B, respectively. The openings 212A, 212B (and therefore the bolts 214A, 214B) may, in embodiments, align laterally. In embodiments, a lateral distance between a neighboring outer edge of the crash bracket 104 and the bolt 214A may be less than the lateral distance between the bolts 214A and 214B. Similarly, in an embodiment, a lateral distance between a neighboring outer edge of the crash bracket 104 and the bolt 214B may be less than the lateral distance between the two bolts 214A and 214B.

As can be seen in FIG. 2, each bolt 214A and 214B may be: (a) adjacent (e.g., upwardly adjacent) the support plate inner surface 2011; and (b) adjacent (e.g., downwardly adjacent) the box rocker 106, e.g., a control surface 106C thereof. Such, however, is merely exemplary and is not intended to be independently limiting. For example, in some embodiments, the steel plate coupled to the box rocker 106 may have a channel that extends therethrough and each bolt may extend from the crash bracket 104 into the channel and be adjacent (i.e., both upwardly adjacent and downwardly adjacent) the steel plate. For example, in some embodiments, at least one of the bolt 214A and 214B, the support plate inner surface and the control surface 106C comprises a coating to reduce friction during the crash. For instance, in an embodiment, the steel plate may be generally rectangular and a racetrack shaped channel may extend therethrough; and each of the bolts 214A and 214B secured to the crash bracket 104 may extend into the racetrack channel. In other embodiments still, a separate steel plate that has to be coupled to the box rocker 106 may be omitted and the box rocker may itself include a channel that serves the function of the channel 210 as described herein.

The bolts 214A and 214B, together with the steel plate channel 210 and the box rocker control surface 106C, may also collectively be referred to herein as a "rotation dampening mechanism" or an "anti-rotation mechanism" 214. The rotation dampening mechanism 214 may serve to eliminate or at least greatly impede any rotational motion of the crash bracket 104 during a frontal (or other) collision. Specifically, as discussed above, during (or due to) the frontal vehicular collision, the column jacket 108 may move in the direction A, which may cause the bend tear sheet distal end 118B welded thereto to also move in the direction A. Movement of the bend tear sheet distal end 118B may apply a force to the bend tear sheet proximal end 118A, and the proximal end 118A may in turn apply a force to the crash bracket 104 coupled thereto. If the rotation dampening mechanism 214 were to be omitted, this force may cause the crash bracket 104 to rotate in a counter-clockwise direction. Such rotation of the crash bracket 104 may be undesirable because it may handicap the shock absorption capability of the bend tear sheet 118 (i.e., as noted, the bend tear sheet 118 absorbs shock optimally when one end of the bend tear sheet (e.g., end 118B) moves relative to the other end (e.g., end 118A)).

The rotation dampening mechanism 214 may counter the force applied to the crash bracket 104 by the bend tear sheet 118 and preclude (or at least significantly inhibit) the rotation of the crash bracket 104. Specifically, as the crash bracket 104 attempts to rotate in a counter-clockwise direction because of the force applied thereto by the bend tear sheet 118 (i.e., by the proximal end 118A thereof), the bolt 214A may apply a counter force generally in a direction 220A and the bolt 214B may apply a counter force generally in a direction 220B. That is, the bolt 214A may come into contact with and push against the box rocker control surface 106C and the bolt 214B may come into contact with and push against the steel plate inner surface 201I to eliminate or at least curtail the rotation of the crash plate 104. By eliminating (or at least significantly inhibiting) the rotational motion of the crash bracket 104 during the frontal collision, the rotation dampening mechanism 214 may ensure that the crash bracket 104 remains relatively stationary whereas the column jacket 108 moves in the direction A relative thereto. The relative movement between the crash bracket 104 and the column jacket 108 (i.e., movement of the column jacket 108 while the crash bracket 104 remains generally stationary) may optimize the shock absorption by the bend tear sheet 118. During the collision, the bend tear sheet 118 may remain coupled to the column jacket 108 (via the welding) and the crash bracket 104 (via the bend tear sheet fastener 117), but bend, tear, and or otherwise deform. The energy used to deform the bend tear sheet 118 may therefore be desirably dissipated, thereby minimizing the shock felt by the driver due to his or her impact with the steering wheel.

Thus, as has been described, the rotation dampening mechanism 214 provides an inexpensive and relatively simple way to ensure that the crash bracket 104, and therefore the bend tear sheet proximal end 118A, remains generally stationary during a crash event. Many different arrangements of the various components depicted, as well as components not shown, are possible without departing from the spirit and scope of the present disclosure. For example, in one embodiment, instead of using the bolts 214A, 214B, the crash bracket 104 may be provided (e.g., formed integrally with) with projecting portions that extend through the channel 210 and eliminate or at least inhibit the rotational motion of the crash bracket 104 during a frontal collision. The artisan will thus understand that embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

The length adjustment drive unit 102 in a further embodiment may include a motor 110 operably coupled to a length adjustment drive unit spindle 112. The length adjustment drive unit spindle 112 comprises an outer thread which engages into an inner thread of a nut member. The nut member is coupled with the crash bracket 104. The motor 110 rotates the length adjustment drive unit spindle (or the "drive unit spindle") 112 and displaces the nut member and the crash bracket 104 in a forward or rearward direction.

It will be understood that certain features and subcombinations are of utility and may be employed without reference to other features and subcombinations and are contemplated within the scope of the claims. Not all steps listed in the various figures need be carried out in the specific order described.

The disclosure claimed is:
1. A steering column assembly for a vehicle, comprising:
a motorized length adjustment drive unit;
a box rocker having a control surface;
a column jacket;
a crash bracket releasably coupled to said column jacket; and
an energy absorbing member having a proximal end and a distal end; said proximal end being coupled to said crash bracket; said distal end being coupled to said column jacket;
a plate coupled to said box rocker such that a channel is formed between said plate and said control surface; and
at least one anti-rotation member coupled to said crash bracket and extending through said channel;
wherein, said at least one anti-rotation member is adapted to inhibit rotation of said crash bracket during a frontal collision of said vehicle.
2. The steering column assembly of claim 1, wherein said at least one anti-rotation member includes a bolt.
3. The steering column assembly of claim 1, further comprising a drive unit spindle coupled to said crash bracket.
4. The steering column assembly of claim 3, wherein said energy absorbing member includes a sheet configured to deform during said frontal collision.
5. The steering column assembly of claim 4, wherein said distal end is welded to said column jacket.
6. The steering column assembly of claim 5, wherein said anti-rotation member inhibits rotation of said crash bracket after said crash bracket is released from said column jacket during said frontal collision.
7. A shock absorbing steering column assembly for a vehicle, comprising:
a box rocker having a channel associated therewith;
a column jacket;
a crash bracket having a pair of openings, the crash bracket openings each being between an outer edge of the channel and the column jacket;
an energy absorbing member coupled to said column jacket and said crash bracket; and
a pair of anti-rotation members respectively extending through said channel and said crash bracket openings for inhibiting rotation of said crash bracket during a collision of said vehicle;
a rivet releasably coupling said crash bracket to said column jacket; and
a length adjustment drive unit;
wherein a plate is coupled to said box rocker to form said channel; and
wherein said energy absorbing member is a bend tear sheet.
8. The shock absorbing steering column assembly of claim 7, wherein said length adjustment drive unit includes a motor having associated therewith with a spindle coupled to said crash bracket.
9. The shock absorbing steering column assembly of claim 8, wherein said spindle is coupled to said crash bracket via a rotationally free nut.
10. The shock absorbing steering column assembly of claim 7, wherein said pair of anti-rotation members includes a first bolt and a second bolt.
11. The shock absorbing steering column assembly of claim 10, wherein said first bolt is configured to constrain rotation of said crash bracket by abutting against a control surface of said box rocker.
12. The shock absorbing steering column assembly of claim 11, wherein said second bolt is configured to constrain rotation of said crash bracket by abutting against a plate coupled to said box rocker.
13. The shock absorbing steering column assembly of claim 12, wherein a lateral distance between said first bolt and a neighboring edge of said crash bracket is less than a lateral distance between said first bolt and said second bolt.
14. A method for inhibiting rotation of a crash bracket of a steering column assembly of a vehicle, comprising:
coupling an energy absorbing member to said crash bracket and a column jacket;

attaching a plate to a box rocker such that a channel is formed therebetween;

passing at least one anti-rotation member through each of said channel and said crash bracket to inhibit rotation of said crash bracket during a frontal collision of said vehicle;

coupling said crash bracket to said column jacket via one of a rivet and a pin; wherein, said rivet or said pin is configured to shear during said frontal collision; and coupling said crash bracket to a spindle of a length adjustment drive unit.

15. The method of claim 14, wherein said anti-rotation member facilitates relative movement between two ends of said energy absorbing member.

\* \* \* \* \*